United States Patent
Hayes et al.

(10) Patent No.: US 10,259,973 B2
(45) Date of Patent: Apr. 16, 2019

(54) ANTI-CORROSION AND LOW FRICTION METAL PIGMENTED COATING

(75) Inventors: Jeffrey Hayes, Long Beach, CA (US); Johan Stephan, Houilles (FR)

(73) Assignee: HI-SHEAR Corporation, Torrance, CA (US)

( * ) Notice: Subject to any disclaimer, the term of this patent is extended or adjusted under 35 U.S.C. 154(b) by 443 days.

(21) Appl. No.: 12/536,443

(22) Filed: Aug. 5, 2009

(65) Prior Publication Data

US 2010/0233471 A1    Sep. 16, 2010

Related U.S. Application Data

(60) Provisional application No. 61/160,176, filed on Mar. 13, 2009.

(51) Int. Cl.
*C09D 183/08* (2006.01)
*C08G 77/26* (2006.01)

(52) U.S. Cl.
CPC ........... *C09D 183/08* (2013.01); *C08G 77/26* (2013.01); *Y10T 428/256* (2015.01); *Y10T 428/258* (2015.01); *Y10T 428/259* (2015.01); *Y10T 428/31544* (2015.04); *Y10T 428/31663* (2015.04)

(58) Field of Classification Search
CPC ................. C09D 183/08; C08G 77/26; Y10T 428/31663; Y10T 428/31544; Y10T 428/258; Y10T 428/259; Y10T 428/256
See application file for complete search history.

(56) References Cited

U.S. PATENT DOCUMENTS

| | | | |
|---|---|---|---|
| 2,466,517 A | | 4/1949 | Blair, Jr. et al. |
| 2,736,658 A | * | 2/1956 | Pfohl et al. ................ 106/14.27 |
| 2,995,603 A | | 8/1961 | Hutchison |
| 3,531,409 A | | 9/1970 | Seffens et al. |
| 3,979,351 A | * | 9/1976 | Sekhon ........................ 524/217 |
| 3,983,304 A | | 9/1976 | Sekhon |

(Continued)

FOREIGN PATENT DOCUMENTS

| | | |
|---|---|---|
| CN | 1199428 | 11/1998 |
| EP | 1094095 B1 | 7/2004 |

(Continued)

OTHER PUBLICATIONS

Hi-Shear Corporation, Hi-Kote® 1 web page, A Protective Coating for Titanium Alloy and Corrosion Resistant Steel Fasteners, pp. 1-2, dated Oct. 25, 2002.

(Continued)

*Primary Examiner* — Kevin R Kruer
(74) *Attorney, Agent, or Firm* — Henricks Slavin LLP

(57) ABSTRACT

The anti-corrosion coating material contains corrosion inhibiting inorganic constituents, or a combination of inorganic and organic corrosion inhibiting constituents, suspended in a polymeric resin. The corrosion resistant composition includes a salt of inorganic constituents, and alkaline polyamine fatty acid salt (PFAS) as a corrosion inhibitor, suspended in a polymeric resin remainder. The coating material may be applied to metal parts but not limited to aircraft fasteners, such as aircraft fastener parts, including nuts and bolts, screws, rivets, and sleeved systems.

18 Claims, 3 Drawing Sheets

(56) References Cited

U.S. PATENT DOCUMENTS

| | | | |
|---|---|---|---|
| 3,998,773 A * | 12/1976 | Crinkelmeyer | C04B 28/02 |
| | | | 106/719 |
| 4,130,524 A * | 12/1978 | Boerwinkle et al. | 524/140 |
| 4,256,811 A * | 3/1981 | Black | 428/562 |
| 4,294,808 A | 10/1981 | Wasel-Nielen et al. | |
| 4,497,702 A * | 2/1985 | Miller et al. | 208/47 |
| 4,512,049 A | 4/1985 | Henry | |
| 5,244,738 A * | 9/1993 | Seibel | C08K 5/47 |
| | | | 106/14.37 |
| 5,399,310 A * | 3/1995 | Payne | B29C 33/62 |
| | | | 106/38.24 |
| 5,487,779 A | 1/1996 | Sinko | |
| 5,558,706 A | 9/1996 | Sinko | |
| 5,593,780 A | 1/1997 | Yap | |
| 5,879,436 A | 3/1999 | Kramer et al. | |
| 5,948,147 A | 9/1999 | Sinko | |
| 6,059,867 A | 5/2000 | Lewis et al. | |
| 6,139,610 A | 10/2000 | Sinko | |
| 6,315,300 B1 | 11/2001 | Philipson | |
| 6,875,479 B2 * | 4/2005 | Jung et al. | 427/493 |
| 7,192,639 B2 | 3/2007 | Philipson | |
| 7,662,241 B2 | 2/2010 | Sinko | |
| 7,918,931 B2 * | 4/2011 | Endo et al. | 106/287.16 |
| 2005/0151120 A1 * | 7/2005 | Philipson | 252/388 |
| 2009/0004468 A1 | 1/2009 | Chen et al. | |
| 2011/0036579 A1 * | 2/2011 | Xiang et al. | 166/305.1 |

FOREIGN PATENT DOCUMENTS

| | | | |
|---|---|---|---|
| JP | 7097676 A | | 4/1994 |
| JP | 52009613 A | | 1/1997 |
| JP | 2003268295 | | 9/2003 |
| JP | 2003322127 | A | 11/2003 |
| JP | 2003336005 | A | 11/2003 |
| WO | WO95/28449 | A1 | 10/1995 |
| WO | WO97/13888 | A1 | 4/1997 |

OTHER PUBLICATIONS

Hi-Shear Corporation, Hi-Kote® 1 brochure, A Protective Coating for Titanium Alloy and Corrosion Resistant Steel Fasteners, pp. 1-4, dated 1992.

Hi-Shear Corporation, Hi-Kote® 2 web page, A Corrosion Resistant Solid Film Lubricant to Reduce Installation Forces for Interference Fit Fasteners, p. 1, dated Oct. 25, 2002.

Ciba Specialty Chemicals, Ciba® IRGACOR® "Organic Corrosion Inhibitor", Apr. 1987, pp. 1-3.

Borinski, Wolfgang, International Search Report for PCT/US2010/027251, dated Jul. 1, 2010, 6 pp., EPO.

HALOX 520 Safety Data Sheet, C.S.B. GmbH, Aug. 16, 2011, pp. 1-8.

Terry, Dr. D. H., Moderator, *Fatty Acids for Chemical Specialties*, Fatty Acid Symposium, New York, NY, 1955, cover page, pp. 131-147.

Japan Office Action for Japan Application No. 2006-549355 dated Oct. 25, 2010.

English translation (redacted) of Japan Office Action for Japan Application No. 2006-549355 dated Oct. 25, 2010.

American Society for Testing and Materials, ASTM Standard D 610-68 Standard Method of Evaluating Degree of Rusting on Painted Steel Surfaces, 1941, reapproved Sep. 13, 1968, 3 pages.

* cited by examiner

ANTI-CORROSION AND LOW FRICTION METAL PIGMENTED COATING

CROSS-REFERENCES TO RELATED APPLICATIONS

This application is based upon and claims priority from U.S. Provisional Application No. 61/160,176, filed Mar. 13, 2009, incorporated by reference in its entirety.

BACKGROUND OF THE INVENTION

This invention relates to protective coatings and to fasteners coated by them, and more particularly to such coatings and fasteners capable of protecting one or both of two dissimilar metals assembled together, from structural corrosion or deterioration.

The invention is applicable to use with a number of different metals and combinations of metals. It is especially applicable to the coating of titanium. A particular application relates to titanium fasteners commonly used in the aluminum structures of aircraft and the like.

It is common practice to assemble aluminum or aluminum alloy structures, such as those of aircraft, with high strength fasteners of titanium or titanium alloys. It is well-known that galvanic action due to electro-chemical coupling effects present in such assemblies often results in undesirable corrosion of the aluminum or titanium elements, or both. It is known that aluminum has a tendency for galvanically induced corrosive attack in contact with titanium, if wet. Furthermore, the corrosion susceptibility of these structures is increased by harsh saline or acidic environments frequently encountered. When the fasteners are of the interference-fit type such as commonly used in the aircraft industry, the problem is further compounded by the fact that a coating on a fastener must be tough and adherent enough to withstand the force fitting operation. Such coatings must also be held to close tolerances.

A number of expedients have heretofore been proposed to reduce or eliminate such galvanic corrosion, among which have been: plating the fasteners with cadmium or aluminum; substitution of steel for titanium fasteners; coating the fasteners with organic or inorganic coatings; use of wet primers or elastomeric sealants during installation; and coating the fasteners or structural exteriors with paint such as a zinc chromate type. Chemicals including phosphates, molybdates, and silicates of some metals, such as sodium silicate, and zinc salts including zinc molybdate, zinc phosphate, and zinc oxide have also been found to be effective as corrosion inhibitors. Such materials are believed to prevent corrosion by a variety of mechanisms, such as forming an electrically non-conductive molecular layer on the metallic substrate, decreasing the permeability of the coating, forming a chemically resistant compound on the metallic substrate, or making the coating material hydrophobic to thus prevent water-borne corrosive materials to reach the substrate, for example.

The several types of coatings and corrosion inhibitors heretofore used have presented problems such as failing to give complete protection, inadequate toughness or adherence, and excessive expense. Even those most widely used in the aircraft industry, namely cadmium plating, organic and inorganic coatings, and sealants have been less than completely satisfactory. The organic and inorganic type coatings typically act as a passive, physical barrier against salt, moisture and the like without providing substantial corrosion protection. Cadmium plated fasteners and wet installation approaches, although finding considerable success in inhibiting corrosion of aluminum structures, have other undesirable limitations, such as an embrittling effect on titanium and high strength steel in direct contact with cadmium. Wet installation imposes undesirably high cost of assembly and presents production adaptability problems and the like.

Chromates have been widely used for over many years as corrosion inhibitors in corrosion inhibiting coatings such as paints, sealants and caulking compounds. Commonly used corrosion inhibitors in the aerospace industry included alkaline earth and zinc salts of hexavalent chromium, which can also enhance adhesive properties of corrosion inhibiting compositions. The general theory of chemical corrosion inhibition action in coatings containing strontium chromate is that the chromate undergoes an oxidation reaction in the presence of water and in between two materials that are dissimilar with respect to galvanic potential. This reaction will typically result in a buildup of an oxide layer on the surface of aluminum with which a fastener made of a corrosion resistant metal alloy, such as titanium for example, is in contact. This oxide layer passively resists the propagation of galvanic corrosion between the interactive materials. However, it is now also generally accepted that such chromates can be toxic, and that the continued usage of chromates in corrosion inhibiting coatings represent health and environment hazards.

One passive corrosion resistant, protective metal-organic base coating that was developed many years ago for non-aluminum metal fasteners has been used in aluminum structures of aircraft, to counter the bimetallic corrosion that the non-aluminum metal fasteners would otherwise cause. That coating includes a mixture of a powdered metallic substance such as powdered aluminum or molybdenum disulfide with a phenol-formaldehyde resin in a volatile carrier selected from lower alkyl alcohols, such as ethyl alcohol, methyl ethyl ketone and petroleum distillate, such as toluene, together with strontium chromate and zinc chromate.

Another type of passive non-chromate, corrosion-inhibiting coating composition for metal surfaces includes at least one inhibitor selected from the group consisting of phosphates, phosphosilicates, silicates, and mixtures thereof, with at least one inhibitor being selected from titanates and zinc salts. The composition may also include a borate such as boric acid, and a succinate. A preferred phosphate includes calcium dihydrogen phosphate, and a preferred titanate is sodium titanium oxide. The zinc salt may include zinc phosphate or zinc cyanamide.

Another passive coating composition is also known that contains about 8% by weight of a salt of inorganic constituents including cations of zinc and calcium, and anions silicates, phosphates, carbonates and oxides, and about 8% by weight of 1-(Benzothiazol-2-ylthio) succinic acid, (BTTSA), suspended in a phenol-formaldehyde thermosetting resin. The remainder may further include a pigment such as molybdenum disulfide, aluminum, polypropylene, or combinations thereof. The corrosion resistant composition typically is dissolved and applied in a volatile solvent carrier. A variation of this coating material contains about 4% by weight of a salt of inorganic constituents including cations of zinc and calcium, and anions of silicates, phosphates, carbonates and oxides, about 4% by weight of 1-(Benzothiazol-2-ylthio) succinic acid, (BTTSA), and approximately 4% by weight of a BTTSA amine complex, suspended in a phenol-formaldehyde thermosetting resin. However, the shelf-life of this chromate free coating composition is approximately three to six months depending on storage temperature. As a result of this short shelf-life, small lot sizes of the coating must be utilized to ensure that inventory is fully used before that shelf-life expiration. Furthermore, it is necessary to make lots exclusively in response to customer orders to maximize the storage life of the material. These requirements increase production costs and decrease logistical flexibility. It has been found that this short shelf-life is due to the introduction of BTTSA as an acidic corrosion inhibitor, which triggers a phenolic resin cross-linking reaction. As a result of this cross-linking, a gelatinous yellow precipitate of phenolic resin forms at the bottom of containers of the coating composition. In addition, the application of these types of BTTSA containing coating compositions on fastener systems, for example by spray or dipping, results in an undesirable tackiness between fasteners, resulting in a degradation of the coating on the parts due to the creation of areas lacking the coating at contact points between the coated parts.

Galling in the form of surface damage of mechanically locked internally threaded fasteners used in the aerospace industry is also a common problem. Such galling typically arises between sliding solid parts, distinguished by macroscopic, usually localized, roughening and creation of protrusions above the original surface, and often includes plastic flow or material transfer or both. There remains therefore a need in the aerospace industry for a wear resistant coating that can result in a reduction of galling of mechanically locked internally threaded fasteners used in multiple torque cycling applications.

It also be would be desirable to provide an anti-corrosion coating to provide a barrier at a junction between fastener parts and an aluminum member with which it is attached that actively resists permeation of water molecules, in addition to passive corrosion resistance, to further limit corrosive effects that galvanic corrosion can have on fastener parts. A need thus still exists for coating formulations that do not contain chromates, but that combine useful passive and active corrosion resistance properties of different corrosion inhibitors to synergistically achieve an effectiveness substantially equivalent to that of chromate containing coatings in preventing corrosion, and reduction of galling of threaded fasteners. The present invention meets these and other needs.

SUMMARY OF THE INVENTION

Briefly, and in general terms, the present invention provides for a corrosion resistant coating to be applied to aircraft fasteners that does not contain chromate, but which is as effective in preventing corrosion as equivalent chromate containing coatings.

Accordingly, the present invention provides for a part coated with a coating material containing a corrosion resistant composition consisting essentially of approximately 4 to 8% by weight of a salt of inorganic constituents formed from cations selected from the group consisting of zinc and calcium, and anions selected from the group consisting of silicates, phosphates, carbonates and oxides, and approximately 2 to 15% by weight of alkaline polyamine fatty acid salt (PFAS) as a corrosion inhibitor, suspended in a remainder which includes a resin such as a phenol-formaldehyde thermosetting resin, although other similar polymeric resins, such as a water based polymeric resin, for example, may be suitable. The remainder may further include a pigment such as molybdenum disulfide, aluminum, polypropylene, or combinations thereof. The corrosion resistant composition typically is dissolved in a volatile solvent carrier, giving the mixture a liquid consistency but providing fast drying after application.

Removal of the acidic BTTSA compounds has not only significantly improved shelf life of the coating composition, but has also eliminated tackiness of fasteners coated with the composition, allowing the coating to be conveniently applied by spraying of the fasteners to be coated in bulk. The use of the alkaline PFAS as a corrosion inhibitor in the coating composition results in passive corrosion resistance performance equivalent to that of the prior BTTSA containing coating compositions. In addition, the frictional characteristic of the coating composition has been enhanced by the addition of PFAS, and the use of the coating composition of the invention significantly reduces galling in general, according to tests performed on fasteners coated with the composition of the invention. In addition, use of the alkaline PFAS as a corrosion inhibitor in the coating composition along with an inorganic salt component, such as a zinc phosphate, for example, that will result in a metal hydroxide layer, such as zinc hydroxide, that acts as an active barrier at the junction of the fastener and the aluminum member. It has been found that the organic molecule of the alkaline PFAS orients itself with the fastener via surface binding due to active amines in the molecule. In this manner, it has been found that the hydrophobic carbon backbone of the molecule orients itself away from the metallic surface of the fastener, so that when the fastener is placed in an aluminum framing, this orientation works in conjunction with the formation of the zinc hydroxide units and develops a hydrophobic layer that resists the permeation of water molecules so that the effect of galvanic corrosion is lessened.

Aircraft parts coated with the coating composition according to the invention have good lubricity and relatively low friction, so that the coating composition is especially suited for interference fit fasteners, threaded systems, and other types of fastener systems. The coating material furthermore is especially adaptable to the application to the metal, such as a fastener part, such as nuts and bolts, screws, rivets, and sleeved systems, for example. The coating material is also desirable for use in coating other types of parts, such as bronze or stainless steel bushes, stainless steel pins, washers or parts which are subject to galling, seizing or fretting issues.

These and other aspects and advantages of the invention will become apparent from the following detailed description and the accompanying drawings, which illustrate by way of example the features of the invention.

DETAILED DESCRIPTION OF THE PREFERRED EMBODIMENTS

Corrosion of fastener assemblies in aircraft due to galvanic action has typically been combated by plating of the fasteners with a corrosion resistant material such as cadmium or aluminum, coating the fasteners with organic or inorganic coatings including phosphates, molybdates, silicates and chromates as corrosion inhibitors, which often fail to provide complete protection, and adequate toughness and adherence. While chromates have been used as an industry standard as corrosion inhibitors in corrosion inhibiting coatings, such chromates can be toxic, and it is desirable to discontinue the use of chromate based corrosion inhibiting coatings.

Figure 1:
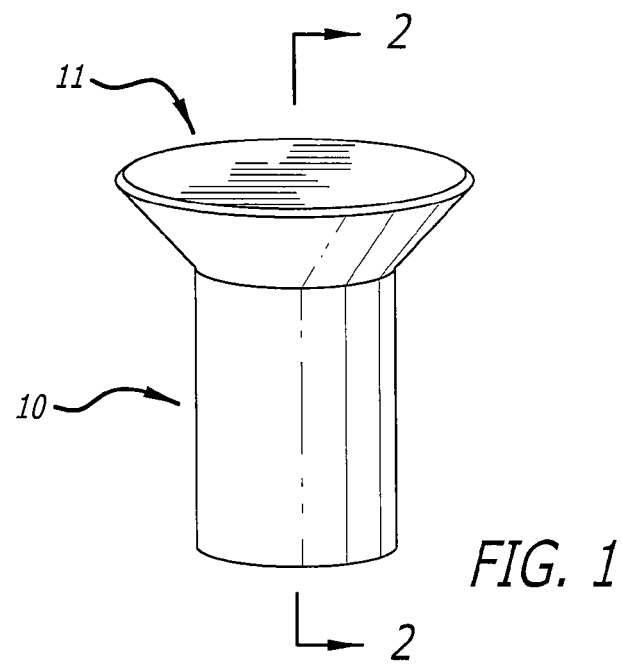
FIG. 1 is an isometric view of a fastener coated by a protective coating according to the invention.
Figure 2:
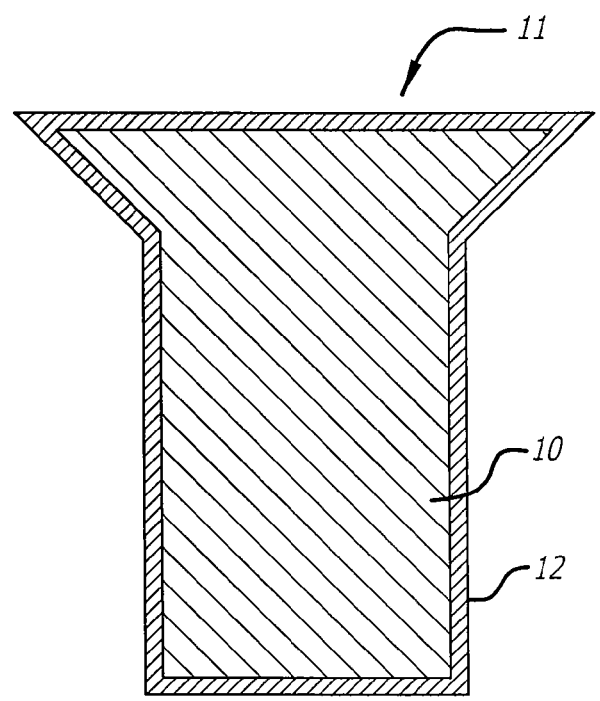
FIG. 2 is a cross-sectional view taken along line 2-2 of FIG. 1.

As is illustrated in the drawings, the invention is embodied in an anti-corrosion coating for fasteners. For example, the anti-corrosion coating may be implemented with a fastener of the type commonly used in an aircraft frame, such as typical rivet type, for example, having an exterior coating of a corrosion resistant material. Referring to FIGS. 1 and 2, the fastener comprises a shank 10 and a head 11, all of a solid metal, which may be of a type referred to above, and the entire surface of the rivet is coated by a protective, corrosion resistant coating 12 provided according to this invention. The rivet is typically of the interference type so that the diameter of the exterior surface at the coating 12 at the shank is slightly greater than the diameter of the hole of the sheet or other structural material into which it is to be forced, such as by pressing or hammering. This forcing of the rivet into the hole produces great frictional stress on the coating. The corrosion resistant coating should therefore also provide a lubricating effect, so as to counteract this abrasive stress.

Figure 3:
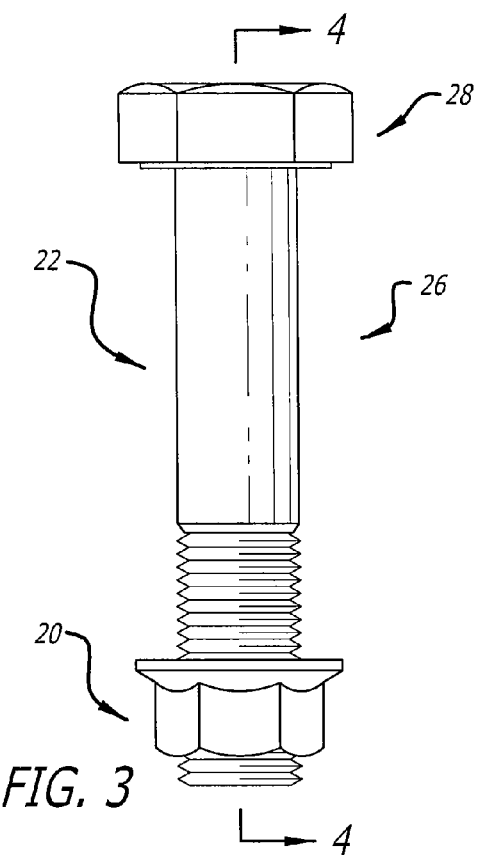
FIG. 3 is a side elevational view of a bolt assembled with a self-locking nut coated by a protective coating according to the invention.
Figure 4:
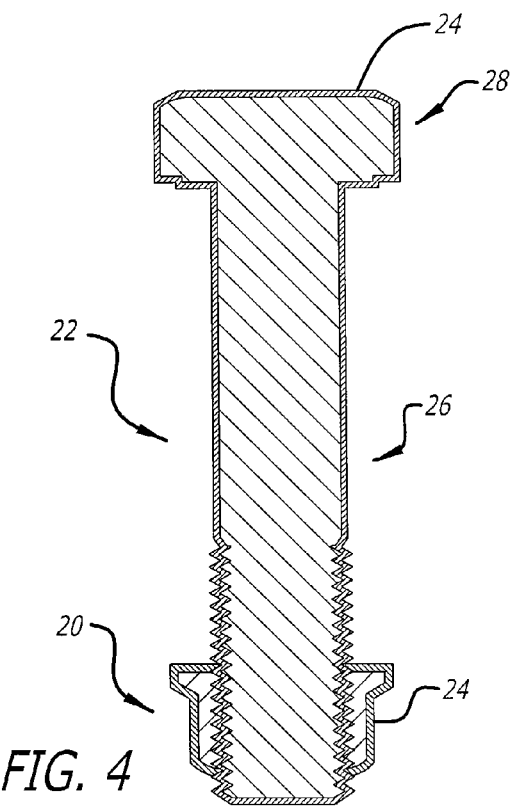
FIG. 4 is a cross-sectional view taken along line 4-4 of FIG. 3.

In another example, the anti-corrosion coating may be implemented with a fastener of the type commonly used in an aircraft frame, such as a typical threaded nut 20 and threaded bolt 22 used in combination, for example, having an exterior coating 24 of a corrosion resistant material, although the coating of corrosion resistant material may be provided for other similar aircraft fastener parts, such as screws, sleeved systems, or rivets, for example. Referring to FIGS. 3 and 4, the bolt comprises a shank 26 and a head 28, all of a solid metal, which may be of a type referred to above, and the entire surfaces of the bolt and nut are coated by the protective, corrosion resistant coating provided according to this invention. The corrosion resistant coating should therefore also provide a lubricating effect, so as to reduce the galling effect between the respective threads of nut and bolt.

Coating mixtures according to this invention useful for the coating of such fasteners contain a corrosion resistant composition consisting essentially of approximately 4 to 8% by weight of a salt of inorganic constituents, and approximately 2 to 15% by weight of alkaline polyamine fatty acid salt (PFAS) as a corrosion inhibitor. The inorganic salt component is formed from cations selected from the group consisting of zinc and calcium, and anions selected from the group consisting of silicates, phosphates, carbonates and oxides. These components are suspended in a phenol-formaldehyde thermosetting resin which forms the remainder of the corrosion resistant composition, which may also include other ingredients. The remainder may, for example, further include a pigment such as molybdenum disulfide, aluminum, polypropylene, or combinations thereof. The corrosion resistant composition typically is dissolved or dispersed in a volatile solvent carrier, giving the mixture a liquid consistency but providing fast drying after application.

The inorganic constituents should have a particle size of 10 microns or less where coating thicknesses must be controlled to less than 0.0001 inch, as in the case of many fasteners. The pigments should be milled into the coating material according to standard milling techniques.

In each of the foregoing embodiments, the corrosion inhibiting constituents are suspended in a phenol-formaldehyde thermosetting resin, which is dissolved in a volatile solvent carrier giving the mixture a liquid consistency but providing fast drying after application. The mixture should be mixed thoroughly and uniformly according to standard paint mixing techniques. The solvent may be a lower molecular weight alkyl alcohol such as methyl, ethyl, propyl or isopropyl alcohol or a similar solvent such as methyl, ethyl ketone or a petroleum distillate in the volatile solvent range such as xylene or toluene, or mixtures of two or more of these solvents. For many applications polytetrafluoroethylene may also be included in the coating material.

The ratio of the corrosion inhibiting constituents to the mixture of resin and solvent can range from about 6 to 23 percent by weight. Where polytetrafluoroethylene is used it can range from about 1 to 10 percent by weight of the mixture of the resin and solvent. The amount of solvent carrier used should be sufficient to provide a desired degree of liquidity, depending somewhat on whether it is to be applied by spraying, dipping or brushing, or the like.

A preferred manner for applying the coating material is by spraying, although either dipping or brushing can be used instead. Because of the volatility of the carrier solvent, it dries and solidifies quickly. The coating is baked after application to a fastener. It has been found that in the application of the coating material to a fastener the thickness of the solidified coating on the fastener can be held to between 0.0002 and 0.0005 inch. This thickness control is important and desirable particularly in the case of threaded fasteners to insure proper thread fit and in the case of aircraft quality interference or non-interference type fasteners. Interference-fit fasteners are commonly made by making their diameters slightly greater than that of the hole through the structural member to which it is to be fastened. Forcing such a fastener part through a hole for the fastener part typically causes abrasion of the coated surface of the fastener part, and can damage the surface of the hole and surrounding work piece structures through which the fastener part is forced. It has been found that the corrosion resistant coating applied according to this invention is sometimes capable of lubricating the fastener part to avoid coating degradation and assist in maintaining adherence of the coating to the fastener part.

EXAMPLES

Corrosion Test Results

Three corrosion resistant coatings with various corrosion inhibitors (1-Strontium Chromate, 2-BTTSA+BTTSA amine+salt mixture, 3-Polyamine Fatty acid salt (PFAS)+salt mixture) were used to coat titanium fasteners, which were inserted in an aluminum alloy block to form an assembly. Each assembly was exposed to neutral salt spray test (5% sodium chloride solution) for 500 hours. A 5% sodium chloride solution is sprayed on the assemblies in a salt spray chamber at 95° Fahrenheit according ASTMB117 standard. After 500 h exposure the assemblies were taken apart and aluminum surface in contact with the fasteners was inspected for corrosion attack (pits). Results are shown in the table below:

| Corrosion Inhibitor | % Corrosion Inhibitor | Number of corrosion pits |
|---|---|---|
| Strontium chromate | 2.5 | none |
| BTTSA + BTTSA Amine + salt mixture | 4 + 4 + 4 | none |
| PFAS + salt mixture | 2-15 + 4 | none |

The addition of a new corrosion alkaline polyamine fatty acid salt corrosion inhibitor has enabled the ability to keep an equivalent corrosion resistance performance as the former chromate-free coating.

Torque/Tension Test Results

Figure 5:
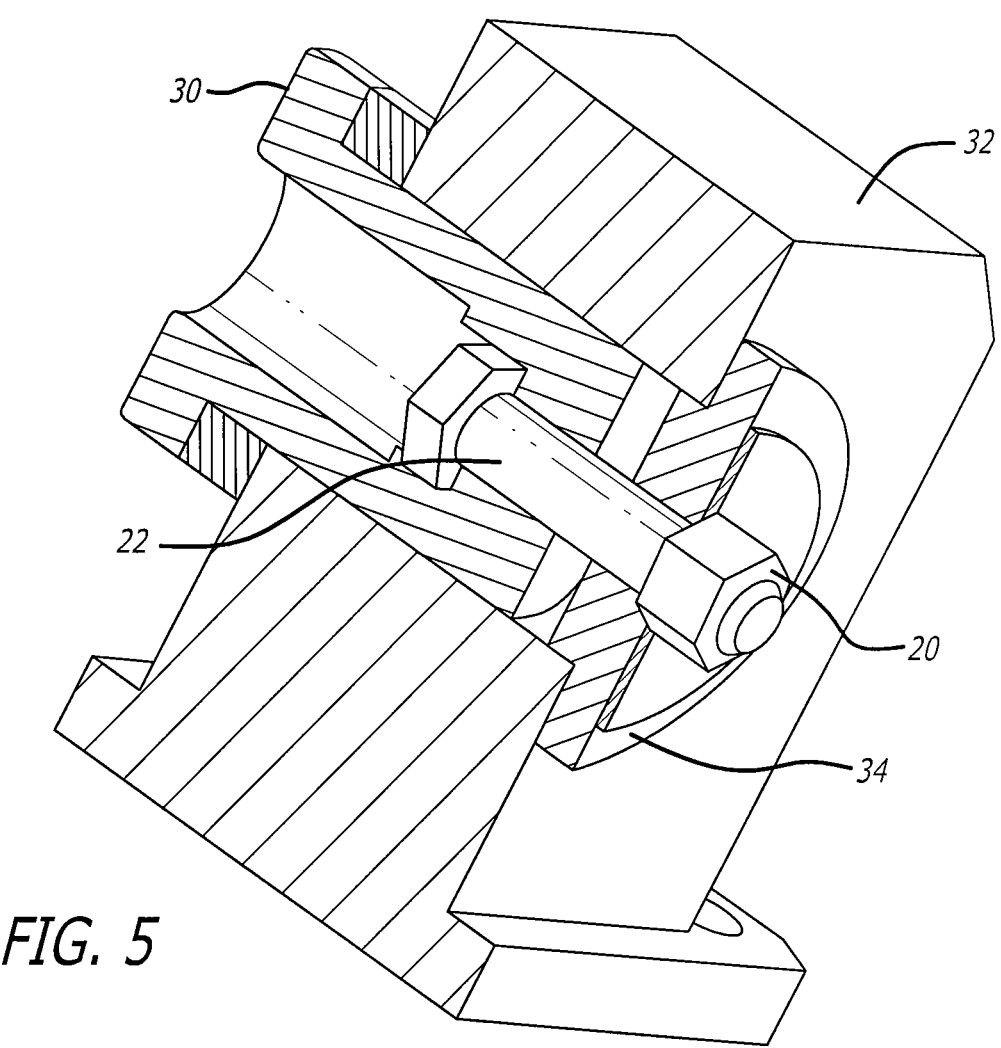
FIG. 5 is a perspective sectional view of a bolt assembled with a self-locking nut and an assembly of work pieces for torque/tension testing.

The torque/tension test is commonly used in the fastener industry to assess the frictional performances of the threaded fastener assembly. The device used for this test is illustrated on FIG. 5.

Locking Torque and coefficient of friction were measured on a bolt assembled with a self locking nut. This test consists in mounting a bolt through an adapter bushing (30) and an adapter plate (34) in a load cell (32) which is able to measure the tension in the assembly and a device is used to apply a rotation on the nut which is able to measure the torque. Using the device, the reaction torque is measured before having contact of the nut on the cell, the maximum value of the reaction torque is called the locking torque.

When the nut is in contact with the assembly, the targeted installation torque is applied and the tension in the bolt is recorded thus these two measurements allow to determine the coefficient of friction between nut and bolt.

Coatings containing various corrosion inhibitors have been tested as shown in the table of results below:

| | Corrosion Inhibitor (coating on bolt) | | |
|---|---|---|---|
| | Strontium Chromate | Strontium Chromate | PFAS + salt mixture |
| | Corrosion Inhibitor (coating on nut) | | |
| | BTTSA + BTTSA Amine + salt mixture | PFAS + salt mixture | PFAS + salt mixture |
| Locking Torque after one tightening cycle (N · m) | 6.37 | 6.63 | 6.47 |
| Locking Torque after two tightening cycles (N · m) | 7.51 | 7.58 | 5.94 |
| Locking Torque after three tightening cycles (N · m) | 10.04 | 10.82 | 7.35 |
| Coefficient of Friction after one tightening cycle | 0.092 | 0.089 | 0.084 |
| Coefficient of Friction after two tightening cycles | 0.085 | 0.083 | 0.078 |
| Coefficient of Friction after three tightening cycles | 0.087 | 0.091 | 0.080 |

When applied on the nut and the bolt, it has been found that the new anti-corrosion coating formed from a coating composition of the invention including PFAS as a corrosion inhibitor exhibits better wear resistance for the locking torque than the former coating formulations. The decrease of the coefficient of friction contributes to the reduction of galling.

It should be appreciated that the anti-corrosion coating composition of the invention including PFAS as a corrosion inhibitor not only provides a traditional passive barrier to corrosion to resist the propagation of galvanic corrosion between the interactive materials, but also provides an active barrier at the junction of the fastener and the aluminum member, since it has been found that the organic molecule of the alkaline PFAS, used in the anti-corrosion coating composition of the invention, orients itself with respect to the fastener via surface binding due to active amines in the molecule, so that the hydrophobic carbon backbone of the molecule orients itself away from the metallic surface of the fastener. When the fastener is placed in an aluminum framing, this orientation works in conjunction with the formation of the zinc hydroxide units and develops a hydrophobic layer that resists the permeation of water molecules, so that the effect of galvanic corrosion is reduced.

Although the coatings described herein have been described with particular reference to use as coatings for fasteners, the coatings are not limited to fasteners but may be applied generally to other surfaces requiring corrosion protection and lubrication, such as high-temperature tool steel or other parts made of alloy steel. Likewise it is not always necessary to apply coatings as thin as those which will ordinarily be applied to fasteners, and thicker coatings may be used for other applications.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A part having an exterior anti-corrosion coating containing a corrosion resistant composition, wherein the improvement is said corrosion resistant composition comprises:
   approximately 4 to 8% by weight of a salt of inorganic constituents formed from cations selected from the group consisting of zinc and calcium, and anions selected from the group consisting of silicates, phosphates, carbonates and oxides;
   approximately 2 to 15% by weight of alkaline polyamine fatty acid salt as a corrosion inhibitor; and
   said salt of inorganic constituents and said alkaline polyamine fatty acid salt being suspended in a remainder including a polymeric resin and being free of acidic BTTSA, and the resulting coating being dried and baked.

2. The part of claim 1, wherein said remainder further comprises polytetrafluoroethylene.

3. The part of claim 1, wherein said remainder further comprises a pigment selected from the group consisting of molybdenum disulfide, aluminum, polypropylene, and combinations thereof.

4. The part of claim 1, wherein said corrosion resistant composition is dissolved in a volatile solvent carrier.

5. The part of claim 1, wherein said salt of inorganic constituents has a particle size of 10 microns or less.

6. The part of claim 1, wherein said part comprises a fastener.

7. The part of claim 1, wherein said polymeric resin comprises a phenol-formaldehyde thermosetting resin.

8. The part of claim 1, wherein said polymeric resin comprises a water based polymeric resin.

9. A metal fastener having an outer surface, the fastener being coated with a corrosion resistant composition which comprises prior to drying:
   approximately 4 to 8% by weight of a salt of inorganic constituents formed from cations selected from the group consisting of zinc and calcium, and anions selected from the group consisting of silicates, phosphates, carbonates and oxides;

approximately 2 to 15% by weight of alkaline polyamine fatty acid salt as a corrosion inhibitor; and said salt of inorganic constituents and said alkaline polyamine fatty acid salt being suspended in a remainder including a polymeric resin and being free of acidic BTTSA and being free of chromate, and the resulting coating being applied to at least a portion of the fastener outer surface and being dried and baked on the fastener surface.

10. A method of providing an anti-corrosion coating on an exterior of a part of a fastening system, comprising the steps of:

providing a corrosion resistant coating including approximately 4 to 8% by weight of a salt of inorganic constituents formed from cations selected from the group consisting of zinc and calcium, and anions selected from the group consisting of silicates, phosphates, carbonates and oxides; and approximately 2 to 15% by weight of alkaline polyamine fatty acid salt as a corrosion inhibitor;

suspending said salt of inorganic constituents and said alkaline polyamine fatty acid salt in a remainder including a polymeric resin and being free of acidic BTTSA, to form an anti-corrosion coating;

applying said anti-corrosion coating to an exterior of a part of a fastening system; and drying and baking said anti-corrosion coating on the part.

11. The method according to claim 10, wherein said remainder further comprises polytetrafluoroethylene.

12. The method according to claim 10, wherein said remainder further comprises a pigment selected from the group consisting of molybdenum disulfide, aluminum, polypropylene, and combinations thereof.

13. The method according to claim 10, wherein said corrosion resistant composition is dissolved in a volatile solvent carrier.

14. The method of claim 10 wherein said salt of inorganic constituents has a particle size of 10 microns or less.

15. The method of claim 10, wherein said corrosion resistant composition is dissolved in a volatile solvent carrier, and the exterior coating of the part is dried and baked.

16. The method of claim 10, wherein said part comprises a fastener.

17. The method of claim 10, wherein said polymeric resin comprises a phenol-formaldehyde thermosetting resin.

18. The method of claim 10, wherein said polymeric resin comprises a water based polymeric resin.

* * * * *